Figure 1:
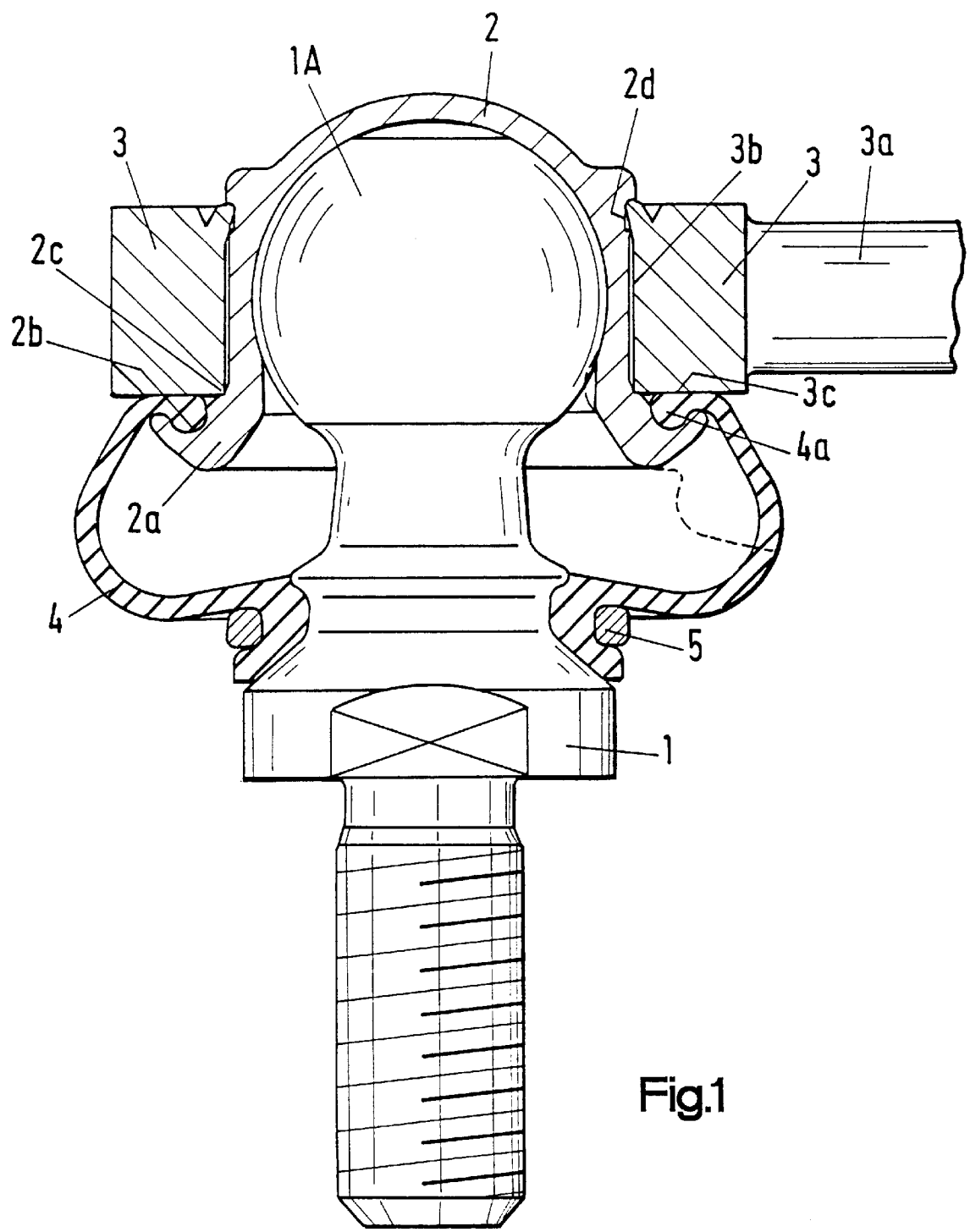

United States Patent
Dorr et al.

[11] Patent Number: 5,876,149
[45] Date of Patent: *Mar. 2, 1999

[54] BALL JOINT

[75] Inventors: Christoph Dorr, Meerbusch; Lothar Broszat, Monheim; Hans-Joachim Schütt, Bergheim, all of Germany

[73] Assignee: TRW Fahrwerksysteme GmbH & Co. KG, Dusseldorf, Germany

[*] Notice: This patent issued on a continued prosecution application filed under 37 CFR 1.53(d), and is subject to the twenty year patent term provisions of 35 U.S.C. 154(a)(2).

[21] Appl. No.: 974,034

[22] Filed: Nov. 19, 1997

Related U.S. Application Data

[63] Continuation of Ser. No. 496,627, Jun. 29, 1995, abandoned.

[51] Int. Cl.⁶ .................................................. F16C 11/00
[52] U.S. Cl. ........................ 403/134; 403/135; 403/122; 403/76; 277/212 FB
[58] Field of Search ...................... 403/134, 133, 403/142, 135, 140, 122, 76; 277/212 FB, 100; 29/898.04, 898.043, 434, 437, 441.1, 509, 515

[56] References Cited

U.S. PATENT DOCUMENTS

| | | |
|---|---|---|
| 3,430,995 | 3/1969 | Herbenar et al. . |
| 4,419,027 | 12/1983 | Trudeau ................................. 403/134 |
| 4,904,107 | 2/1990 | Fukukawa et al. . |
| 4,954,006 | 9/1990 | Suzuki et al. ...................... 403/133 X |
| 5,368,408 | 11/1994 | Shimizu et al. .................... 403/133 X |
| 5,489,161 | 2/1996 | Sugita et al. ........................... 403/134 |
| 5,513,433 | 5/1996 | Sumiyoshi et al. . |

FOREIGN PATENT DOCUMENTS

| | | |
|---|---|---|
| 0612926 | 8/1994 | European Pat. Off. . |
| 3905474 | 4/1990 | Germany . |

*Primary Examiner*—Joanne Silbermann
*Assistant Examiner*—William L. Miller
*Attorney, Agent, or Firm*—Tarolli, Sundheim, Covell, Tummino & Szabo

[57] ABSTRACT

A ball joint with a ball (1a) that is arranged on a gudgeon (1) and situated in a ball socket in a rotatable and tiltable fashion. The ball socket consists of plastic and is closed on one side. The ball socket is arranged in a housing (3). The ball socket is sealed at its opening, which faces the gudgeon (1), by a sealing bellows (4) arranged between the housing (3) and the gudgeon (1). An edge (4a) of the sealing bellows (4) on the side of the ball is clamped in the axial direction between the housing (3) and an extension (2a) of the ball socket (2) on the side of the gudgeon.

3 Claims, 1 Drawing Sheet

BALL JOINT

This application is a continuation of application Ser. No. 08/496,627 filed on Jun. 29, 1995 now abandoned.

The invention pertains to a ball joint with a ball that is arranged on a gudgeon and situated in a rotatable and tiltable fashion in a ball socket that consists of plastic and is closed on one side, with said ball socket being arranged in a housing and sealed at its opening, which faces the gudgeon, by means of a sealing bellows that is arranged between the housing and the gudgeon.

Ball joints of this type are generally known. They can be manufactured inexpensively and are primarily used in motor vehicles. The sealing bellows that seals the ball joint and is arranged between the housing and the gudgeon is fixed on the gudgeon as well as the housing by means of one respective clamping ring.

The invention is based on the objective of additionally developing a ball joint of the initially mentioned type such that an augmentation of the possible tilting angle can be attained while simultaneously simplifying the constructive design and the assembly of said ball joint.

According to the invention, the solution to this objective is characterized by the fact that the edge of the sealing bellows on the side of the ball is clamped in the axial direction between the housing and an extension of the ball socket on the side of the gudgeon.

This additional development of a known ball joint provides the advantage that, when inserting the ball socket placed on the ball into the housing, the edge of the sealing bellows on the side of the ball is automatically fixed on the housing and simultaneously centered without having to specially design the housing for this purpose. This measure not only eliminates a separate clamping ring for fastening the sealing bellows on the housing, but also a corresponding processing of the housing for fastening the bellows. Known solutions that were disclosed so far either impair the proper rolling motion of the sealing bellows or limit the attainable angular deflections or cause damage to the sealing bellows at excessively large tilting angles.

According to one additional characteristic of the invention, the housing can be designed in an annular fashion and have a continuous bore for the ball socket that is held in the housing by means of form fitting at its closed side. In this case, a particularly simple design of the housing is attained. According to the invention, a particularly simple fastening is attained due to the fact that the closed face side of the ball socket is provided with a groove by means of which said ball socket is held in a form fitting fashion, namely by caulking the housing.

According to one additional characteristic of the invention, a thickened edge of the sealing bellows can be arranged in an axial receptacle groove of the extension of the ball socket on the side of the gudgeon and adjoin a plane surface of the housing that surrounds the bore.

According to one additional characteristic of the invention, the outer cylindrical surface of the ball socket that is situated at the end on the side of the gudgeon is provided with a shoulder that fixes said ball socket in an axially defined end position toward its closed side. In order to compensate dimensional tolerances with respect to the height of the housing due to localized plastic deformations of the ball socket material, said shoulder can be realized as a slanted annular surface.

FIG. 1 shows a longitudinal section through one embodiment of the ball joint according to the invention.

The ball joint comprises a ball 1a that is arranged on a gudgeon 1, preferably realized as one piece with said gudgeon, and situated in a rotatable and tiltable fashion in a housing 3 by means of a ball socket 2 that consists of plastic and is closed on one side. The housing is, for example, arranged on the end of a strut 3a. A sealing bellows 4 for sealing the bearing surfaces of the ball joint is arranged between the housing 3 and the gudgeon 1.

In order to fix the edge 4a of the sealing bellows 4 on the side of the ball onto the housing 3 without having to correspondingly process said housing 3, the ball socket 2 is provided with an extension 2a on the side of the gudgeon. This extension is provided with an annular receptacle groove 2b for the thickened edge 4a of the sealing bellows 4 and, when inserting the ball socket 2 into the housing 3, presses said edge 4a against a plane surface 3c of the housing 3 in the axial direction and consequently clamps said edge in its position. The extension 2a of the ball socket 2 can be simultaneously realized as a limit stop for limiting the angular deflection of the gudgeon 1 relative to the housing 3. The maximum angular deflection is illustrated in the FIGURE.

A special design of the housing 3 for realizing the fastening of the sealing bellows 4 is eliminated due to the fact that the edge 4a of the sealing bellows 4 on the side of the ball is clamped between one surface of the housing 3 and the extension 2a of the ball socket 2 in the axial direction.

In the embodiment shown, the housing 3 is realized in an annular fashion with one continuous bore 3b that has a constant diameter and serves for accommodating the cylindrical outer surface of the ball socket 2. In order to fix the ball socket 2 in the housing 3 by means of form fitting, the housing 3 can be caulked within the region of the surface that surrounds the closed side of the ball socket 2, with the thusly deformed housing material being pressed into a groove 2d in the cylindrical outer surface of the ball socket as shown in the FIGURE. This measure results in a form fitting between the ball socket 2 and the parts of the housing 3 that were deformed due to the caulking.

The ball socket 2 adjoins the underside of the housing 3 with an annular shoulder 2c and consequently creates a defined end position of the ball socket 2. This surface can also be realized in the form of a slanted annular surface in order to compensate for tolerances.

The FIGURE indicates that the invention provides a ball joint that has a very simple constructive design and consequently can be manufactured inexpensively and assembled in a simple fashion. The end of its sealing bellows 4 on the side of the gudgeon is fixed on said gudgeon 1 by means of a clamping ring 5.

LIST OF REFERENCE NUMERALS

1 Gudgeon
1a Ball
2 Ball socket
2a Extension
2b Receptacle groove
2c Shoulder
2d Groove
3 Housing
3a Strut
3b Bore
3c Surface
4 Sealing bellows
4a Edge
5 Clamping ring

We claim:

1. A ball joint comprising:
    an annular housing having a first end portion, a second end portion, and a cylindrical inner surface defining a bore extending from said first end portion to said second end portion, said first end portion including an end surface extending radially relative to said cylindrical inner surface, said second end portion of said housing including an annular projection extending radially inward from said cylindrical inner surface of said housing;

a plastic ball socket arranged within said bore in said housing, said ball socket having an opening on a first axial end and being closed on a second axial end, said first axial end of said ball socket adjoining said first end portion of said housing and said second axial end of said ball socket adjoining said second end portion of said housing, said ball socket including an extension projecting axially beyond said first end portion of said housing and radially overlying said end surface of said first end portion of said housing, said extension including a first annular groove facing said end surface of said first end portion of said housing, said ball socket including a cylindrical outer surface extending parallel to said cylindrical inner surface of said housing, said ball socket further including a second annular groove adjacent said second axial end of said ball socket, said second annular groove being defined by first and second radially extending surfaces and an axial surface extending parallel to said outer surface between said radially extending surfaces, said annular projection at said second end portion of said housing extending into said second annular groove in said ball socket to secure said ball socket in said housing;

a ball arranged on a gudgeon and located in said ball socket, said ball being rotatable and tiltable relative to said ball socket; and a sealing bellows arranged between said housing and said gudgeon for sealing said opening in said first axial end of said ball socket, said sealing bellows having an annular lip received in said first annular groove in said extension of said ball socket, said sealing bellows being clamped between said end surface in said first end portion of said housing and said extension on said ball socket to secure said sealing bellows to said housing.

2. The ball joint of claim 1 wherein said ball socket further includes a shoulder at said first axial end and which interconnects said outer surface with said extension of said ball socket, said ball socket being fixed axially at said first axial end portion of said housing by said shoulder.

3. The ball joint of claim 2 wherein said shoulder comprises a slanted annular surface.

* * * * *